(12) United States Patent
Farace (10) Patent No.: US 8,172,091 B2
(45) Date of Patent: May 8, 2012

(54) CONNECTION DEVICE FOR HYDRAULIC CIRCUIT

(75) Inventor: Enzo Farace, Armeno (IT)

(73) Assignee: Righi S.p.A., Armeno (IT)

( * ) Notice: Subject to any disclaimer, the term of this patent is extended or adjusted under 35 U.S.C. 154(b) by 793 days.

(21) Appl. No.: 12/155,007

(22) Filed: May 28, 2008

(65) Prior Publication Data

US 2008/0290017 A1 Nov. 27, 2008

Related U.S. Application Data

(63) Continuation-in-part of application No. 11/663,891, filed as application No. PCT/IB2005/002337 on Aug. 5, 2005, now abandoned.

(30) Foreign Application Priority Data

Sep. 28, 2004 (EP) .................................... 04023021
Mar. 11, 2005 (EP) .................................... 05005384

(51) Int. Cl.
*B01D 35/00* (2006.01)
*B01D 35/28* (2006.01)

(52) U.S. Cl. ........ 210/435; 210/459; 210/448; 210/452; 210/453; 210/454; 210/455; 210/447; 210/463; 137/550

(58) Field of Classification Search .................... None
See application file for complete search history.

(56) References Cited

U.S. PATENT DOCUMENTS

| 1,927,582 | A | * | 9/1933 | Denk | 210/117 |
| 3,878,867 | A | * | 4/1975 | Dirks | 138/30 |
| 4,215,726 | A | * | 8/1980 | Tagami | 138/30 |
| 2003/0056833 | A1 | | 3/2003 | Gates | |
| 2004/0089350 | A1 | * | 5/2004 | Marty et al. | 137/550 |

FOREIGN PATENT DOCUMENTS

| BE | 1007731 A6 | 10/1995 |
| DE | 3103614 A1 | 12/1981 |
| EP | 0341345 A | 11/1989 |

OTHER PUBLICATIONS

International Search Report mailed Nov. 1, 2006.

\* cited by examiner

*Primary Examiner* — Benjamin Kurtz
(74) *Attorney, Agent, or Firm* — Nixon & Vanderhye P.C.

(57) ABSTRACT

The present invention relates to a connecting element for hydraulic circuits. The device comprises a body provided with one channel having an inlet section and an outlet section, the channel being connectable with a fluid supply line, said body being further provided with an aperture which opens, to the outside, into a seat located in the channel. The devices also comprises a filter element insertable in a removable manner into the seat, through the aperture, in order to intercept the fluid in the channel. Advantageously the filter element is defined by at least two portions, coupled with angled or radiused joints to define an internal volume, one portion having a different geometry from the other.

21 Claims, 8 Drawing Sheets

CONNECTION DEVICE FOR HYDRAULIC CIRCUIT

This application is a continuation-in-part of application Ser. No. 11/663,891 filed Apr. 18, 2007, now abandoned which in turn is the U.S. national phase of International Application No. PCT/IB2005/002337 filed 5 Aug. 2005 which designated the U.S. and claims priority to EP 05005384.2 filed 11 Mar. 2005 and EP 04023021.1 filed 28 Sep. 2004, the entire contents of each of which are hereby incorporated by reference.

The present invention relates to a connecting device or element for hydraulic circuits.

Connecting devices or elements for hydraulic circuits are available on the market, having the function to connect either different lengths of a line or two or more lines in fluid communication one another. Although herein below reference will be explicitly made to the field of residential water supply lines, the invention is not limited to this application field, but it can be also applied to different fields, for example in the industrial field for connecting lines for supplying oil, coolants, alimentary liquids, etc.

As a rule, in the buildings, the connecting elements for water supply lines are set upstream of faucets, sewers, boilers, water-heaters, etc. The connections are for example built in, i.e. provided into the walls together with their respective pipelines. A typical example is represented by one or more connections being provided upstream of a shower faucet. Alternatively, the connecting elements may be employed outside the walls in order to connect various elements forming the hydraulic systems, such as for example flexible elements, boilers, faucets, etc., to the pipes of the main hydraulic circuit.

Generally, the hydraulic circuits in the buildings are provided with suitable elements in order to filter the impurities present in the water. Domestic hydraulic circuits are often provided with filters having the function of intercepting the solid particles present in the water, such as limestone particles, sand particles, ground particles, etc. Filters are typically located either upstream or downstream of the connecting elements according to the water flowing direction, being often in succession along the same supply line, and they are interposed between the pipe and the connecting element.

The hydraulic circuits provided with the connecting elements and the conventional filters have several drawbacks. Particularly, these drawbacks are shown when the filter elements have to be cleaned or replaced, for example because they have been clogged by impurities or damaged.

In the case where a connecting element and its respective filter are provided outside a wall, i.e. installed at sight, directly accessible, the possible maintenance actions for cleaning or replacing the filter require the attendance of specialized operators, with an obvious increase in costs. In fact, in order to access the filter, when the latter is set between the connecting element and a pipeline, the connecting element requires to be separated from the pipeline, and hence, it is necessary to isolate and disassemble the respective length of the circuit. In private dwellings these operations are generally performed by a plumber.

The cleaning (or replacing) of a filter element is particularly hard and expensive if a circuit is provided with connecting elements and their respective filters, being embedded within a wall, as it is often provided at the ending length of the circuits supplying water to the showers in private dwellings. In fact, in the latter case, it is necessary to have access to the inside of the wall in order to reach for the filter element. Therefore, to the normal charges deriving from the operations on the hydraulic circuit, possible extra charges for having access to possible parts housed inside the wall are also added up.

For the reasons described above, the need for alternative solutions allowing a quick cleaning of the filter elements, which can be simply and cost-effectively performed also by those unskilled in the art has been felt for a long time.

EP 0341345 discloses a connection device for hydraulic circuits. The connection device has a body wherein a rectilinear channel is provided to guide a flow medium. A filter element is accommodated in the body, perpendicularly to the channel, to intercept eventual impurities, or solid particles, carried by the flow medium. The filter element has a cylindrical shape and can be inserted in the channel through an opening provided in the body. A cap closes the opening and locks the filter element in the body of the connection device. The same cap collects the impurities which enter the cylinder defined by the filter element through a window provided on its lateral surface. In order to avoid misalignment of the window with respect to the direction of the flow, the filter element is provided with two wing-like projections arranged diametrically opposed at the bottom of the filter element for engaging corresponding seats located at the edge of the body opening, the two wing-like projections being biased in the respective seats by the closing cap.

The connection device according to EP 0341345 has several drawbacks. For instance, since the closing cap is intended to collect filtered particles, it has to be provided under the filter element, i.e. in the direction of the filtered particles falling down under action of the gravity force. Thus the device according to EP 0341345 has to be connected to flow supply lines always with the closing cap oriented downwardly, i.e. facing the ground, while different positions of connection devices are often required. Besides, when a valve is provided in the connection device, normally immediately upstream of the filter element, the valve command handle may interfere with the closing cap. In this respect the cap and the handle are located on opposite sides of the connection device, i.e. diametrically opposed with respect to the internal channel, this limiting orientating of the connection device to a single position wherein the cap is positioned facing the ground and the valve command handle is located on the top of the body.

Moreover, the filter element has to be manufactured with the aforesaid wing-like projections in order to overcome rotation of the filter element while coupling the closing cap to the body of the connection device. When inserting the filter element in the connection device, for instance after cleaning of the filter, care has to be taken in order to correctly engage the projections in the respective seats of the device body. This step may be difficult to perform, for instance when the connection device is not easily accessible or visible. In particular, the user may insert the filter element in the wrong way, with the window arranged downstream with respect to the fluid flow. In fact the wing-like projections do not prevent the user from inserting the filter element in the body of the device in two positions, a correct one wherein the window faces the incoming flow, and a wrong position wherein the filter element is rotated 180 degrees from and the window faces the device outlet.

Another drawback is in that if the coupling between the wing-like projections and the respective seats provides an interference fit, the filter element may be difficult to extract from the body of the connection device. On the contrary, if the coupling between the wing-like projections and the respective seats is loose, the filter element may fall, due to its weight, before the user supports the same filter element within the body of the device by screwing the closing cap.

Besides such wing-like projections are easy to break, this literally impeding the filter element to be correctly positioned.

The malfunctioning or the presence of dirt on a known filter element may further cause a malfunctioning of the apparatus provided downstream of the same filter, and this is not certainly a minor drawback relative to the traditional systems drawbacks that have been already described above. For example, gas-fired boilers, thermostatic faucets, washing machines, etc., may not properly operate because of the cutting of the water flow due to a partially clogged filter. Furthermore, a damaged filter may allow solid particles to move, for example, to a gas-fired boiler and the boiler coil risks to be clogged by these particles, thus causing the malfunctioning.

The conventional connecting elements have several other drawbacks besides those already mentioned above. For example, they are often employed in order to connect two or more pipelines according to a curve shape, an S shape, etc. This means that the connecting elements can be either straight or curved, with different curvature radius, or they can be of an eccentric shape, with an S-course. The water which flows through a curved connecting element may transmit to the same element some vibrations due either to the sudden change of direction (the water impact on a wall of the connection), or to the high speed of the water supplied to the connection or, moreover, to its turbulence, etc. The vibrations transmitted by the fluid to the connecting element may be in turn transmitted to the pipelines which are connected to the same connecting element. Generally, these vibrations give rise to grating noises. For example, sudden changes in the water flow rate in a hydraulic circuit, due to a fast faucet opening or closing, may produce the phenomenon known as the "water hammer" in the respective pipelines, and this phenomenon is generally shown with strong vibrations as well as a grating whistle.

A further drawback of the conventional connecting elements lies in that they do not prevent the fluid from flowing back into its respective hydraulic circuit. For example, in some cases, following the closing of a faucet in a water supply pipeline, a water flow can flow back into the pipeline, i.e. it can flow through the same pipeline in the opposite direction to the set supply direction.

On the other hand, the need for preventing this backflow has been felt for a long time, given that the main standards provide that the drinking water supplied to private dwellings must be separated from the waste water.

The object of the present invention is to provide a connecting element for hydraulic circuits which solves the drawbacks of the prior art in a simply and cost-effective manner.

It is a further object of the present invention to provide a connecting element for hydraulic circuits allowing a reduction in the maintenance costs of the respective circuit, by improving at the same time the functionality thereof.

It is also an object of the present invention to provide a connecting element for hydraulic circuits preventing the backflow of the fluid into its respective line, in the opposite direction to the supply one.

A further object of the present invention is to provide a connecting element for hydraulic circuits enabling the vibrations transmitted to the element itself by the fluid flowing therethrough to be either reduced or absorbed.

Another object of the present invention is to provide a connecting element for hydraulic circuits, provided with a filter element, which allows for the easy handling of the same filter element also by the unskilled user.

A still object of the present invention is to provide a connecting element for hydraulic circuits, provided with a filter element, which can be mounted independently from the vertical orientation of the filter element.

These and other objects are achieved by the present invention which relates to a connecting element for hydraulic circuits, of the type comprising a body being provided with at least one channel having an inlet section and an outlet section, said channel being connectable with a fluid supply line, said body being further provided with at least an aperture which opens, to the outside, into a seat located in said channel between said inlet section and said outlet section, at least a filter element insertable in a removable manner into said seat, through said at least one aperture, in order to intercept said fluid in said channel, characterized in that said filter element is defined by at least two portions coupled with angled or radiused joints to define an internal volume, one portion having a different geometry from the other.

The connecting element of the present invention permits an extremely easy handling of the filter element by the user, with no need for unhandy positioning means to be provided on the same filter element.

The connecting element of the present invention may be formed so as to form an angle from 0° to 180° between the supply line and the supplied line. In other words, the channel extending between the inlet section and the outlet section may be straight or may be provided with a curve for deviating the flow path.

In a special embodiment of the present invention, a first portion of the filter element is a planar face facing the incoming flow. The first portion is jointed to at least another portion to define a volume within the same portions. In order for the fluid to enter the internal volume of the filter element, the planar face is provided with an opening or window. Generally, the two portions may be curved surfaces, one having a different curvature with respect to the other. Preferably the filter element has at least one planar surface.

Preferably the filter element has a semi-cylindrical shape, i.e. the cross section of the filter element has a semi-cylindrical shape, defined by the planar face and by a curved surface connected to the vertical edges of the planar face (the edges being parallel to the axis of the filter element). A baffle, a gauze or apertures are provided on the curved surface to operate filtering of the fluid.

In order to avoid rotation of the filter element within the body of the connection device, the seat has a complementary shape with respect to the shape of the same filter element. The filter element matches the shape of the seat, i.e. fits in the seat and cannot rotate. The seat may be directly defined within the channel or may be defined by a suitable insert element arranged within the body of the connection device. The filter element is thus self-orientating with respect to its seat, i.e. it cannot be misaligned with respect to the flow direction.

The filter element is coupled to a pin which closes the aperture provided in the body of the device for inserting the same filter element. The pin may bias the filter element in its seat. Coupling between the filter element and the pin allows for rotation of the same pin around its axis, in such a way that the pin may be secured to the body of the device, for instance by screwing, while the filter element is still, i.e. while it does not rotate.

Advantageously both the pin and the filter element are provided each with a tank to collect filtered impurities. Thus the connection device may be arranged in a traditional way or upside down, i.e. regardless of the vertical orientation of the filter element.

The connection device may be advantageously implemented in brass, steel, plastic, bronze or other suitable metallic alloys.

Advantageously, the filter element may be easily separated from the connecting element according to the present invention, so that it can be cleaned or replaced. Contrary to what has been provided by the prior art, in fact, the filter element can be easily reached for by an operator with no need to disassemble either part of the supply line or the same connecting element, with obvious economical advantages on the maintenance costs of the line. In fact, the filter element can be separated (removed) from the connection, then cleaned and inserted again into the connection itself, with no need to separate the connection from the pipeline of the relative hydraulic circuit. For the reason described above, when the connection of the invention is employed in the hydraulic circuits in the buildings, it is preferably set outside the walls, so as to be directly reached for said maintenance of the filter element.

Said filter element may be advantageously implemented either in a plastic or a metallic material such as for example brass, steel or suitable alloys.

The filter element is permeable to the fluid which flows into the connecting element, preferably water, and catches the impurities suspended in the fluid. For example, the filter element may comprise one or more filters of the mechanical, chemical, electrochemical or electromagnetic types.

Preferably, the filter element is of the mechanical type, suitable to catch solid impurities having predetermined sizes. According to a preferred aspect of the present invention, the filter element comprises at least one baffle which can be inserted into said channel. The baffle is provided with a plurality of apertures to allow the fluid to flow. The apertures may have a gauged section in order to allow the flowing only of those particles having certain sizes.

The shape of the baffle (and the shape of the filter element in general) also depends on the shape of the channel section inside the connection. In fact, the channel may have a circular section, a square section, a hexagonal section, etc. Preferably, the shape of the baffle matches the shape of the channel section, such that the filter element may intercept the whole fluid flow which flows into the channel.

The filter element can be set into the channel of the connecting element in different manners being equivalent to one another, for example the filter element may slide on a guide being transversal to the channel, according to a guillotine coupling.

The filter element may designed in different manners according to the use which it is addressed to. For example, it may comprise a netting made of plastic or metallic material which can be set in the channel, in a transversal position relative to its axis. This solution is particularly effective for stopping the sand or the limestone which may exist for example in a water flow in the pipelines for domestic use. The mesh of the wire netting can be sized in order to stop the particles having predefined sizes.

Moreover, the filter element can be of a multilayer type, comprising for example two wire nettings, an element made of a spongy material being interposed therebetween. This solution allows a filtering of the fluid to be carried out by means of spongy elements, and may be applied for example either to hydraulic systems for aquariums, or pump or supply impeller water or oil supply circuits.

The filter element may be advantageously of a washable type, for example either by means of a simple water jet or through the treatment with a specific product, such as to be cleaned from impurities. For example, if the connecting element according to the invention is employed in the hydraulic circuits in private dwellings, this characteristic allows the maintenance costs of these circuits to be drastically reduced.

In fact, if the water particles clog the filter element, thus reducing the flow of the water supplied, it is sufficient to extract the filter element from the body of the connecting element, then clean it and insert it again into the same body in order to restore the proper functioning of the respective circuit. This operation does not require expensive actions by skilled operators, but it can be performed by the usual user of the circuit.

According to an embodiment of the present invention, the filter element is associated to two tanks for collecting filtered impurities. Preferably, a bottom tank is set into the channel inside the connection such as to collect the impurities being stopped either by the baffle or by other equivalent devices and then precipitated, and it can be extracted from the body of the connecting element together with the filter element. A top tank is provided within the pin associated to the filter element.

According to a particular embodiment of the invention, the connecting element comprises a stop valve having the function of stopping the fluid flow through the channel inside the body of the connection. This valve may be provided either upstream or downstream of the filter element being provided within the connecting element, as already said. Preferably, the stop valve is provided upstream of the filter element, for example in an intermediate position between said filter element and the inlet section. By closing the stop valve it is possible to stop the fluid flow upstream of the filter element, thus facilitating the separation of the latter from the body of the connecting element.

According to a further embodiment of the present invention, the connecting element comprises a check valve having the function of preventing the fluid from flowing through the connection itself, in the opposite direction to the inlet section.

In practice, the check valve is for example provided at the outlet section of the connecting element and prevents the fluid from flowing back into the channel and, hence, from flowing back into its respective supply line. Consequently, the check valve is set downstream of the filter element, being interposed between the latter and the outlet section.

According to a further embodiment, the connecting element is equipped both with said stop valve and the check valve.

In the supply line, the fluid may reach a high speed, and hence, the motion thereof can be of a turbulent type. Furthermore, the fluid can be subjected to sudden changes in the flow or direction. For example, the water supply pipelines in private dwellings are equipped with several valves and faucets for adjusting the water flow and provide a plurality of changes of direction that are essential to supply water to different rooms. Because of the strong turbulence, the sudden changes in the flow rate or direction, the water flow which flows through the connecting element can transmit harmful vibrations to the element itself. For the reason described above, the connecting element may be equipped with a device having the function of absorbing the vibrations transmitted by the fluid.

Preferably, the absorption of the vibrations, or the partial reduction thereof, is obtained by using an elastically deformable element which covers part of the internal surface of the channel of the connecting element. Advantageously, the deformable element can absorb at least partially possible "water hammers", being caused for example by sudden changes in the flow rate of the flowing fluid.

A further advantageous is given by the deformable element ability to reduce possible impacts due to the fluid against a surface of the channel inside the connecting element. For example, if the connecting element is of an eccentric shape type, i.e. when the channel has a generically S-course, the deformable element allows to at least partially reduce the impact caused by the fluid while entering the connecting element and bumping against a curved portion of the channel.

The vibration absorbing device can be set along the channel of the connection either upstream or downstream of the filter element, for example in an intermediate position relative to the filter element and the stop valve. Preferably, the vibration absorbing device is set into the channel of the connection at the inlet section, for example near curves or section reduction of the channel.

As will be understood by those skilled in the art, the connecting element of the invention allows the filter element to be simply and quickly cleaned and, accordingly, allows the maintenance costs of its respective hydraulic circuit to be drastically reduced. Furthermore, the connecting element according to the invention, being equipped with the vibration absorbing device, is much more noiseless relative to the conventional connecting elements. If the connecting element is provided with the stop valve, it allows to operate on the filter element with no need to isolate the respective supply line upstream, by simply stopping the flow by means of this valve upstream of the same filter element. Furthermore, the connecting element may be equipped with a check valve which prevents the fluid from flowing back into the respective supply line.

Therefore, the connecting element of the invention is extremely useful in the field of hydraulic circuits in buildings, such as for example a connecting element of water lines in private dwellings. However, it can be employed, with the same advantages, for connecting hydraulic circuits of the industrial type, such as either oil supply or delivery circuits to machinery, or coolant circulating circuits, etc.

Further characteristics and the advantages of the present invention will be better understood from the following description, which is given by way of illustrative and non-limiting example with reference to the annexed schematic drawings, in which.

Figure 1:
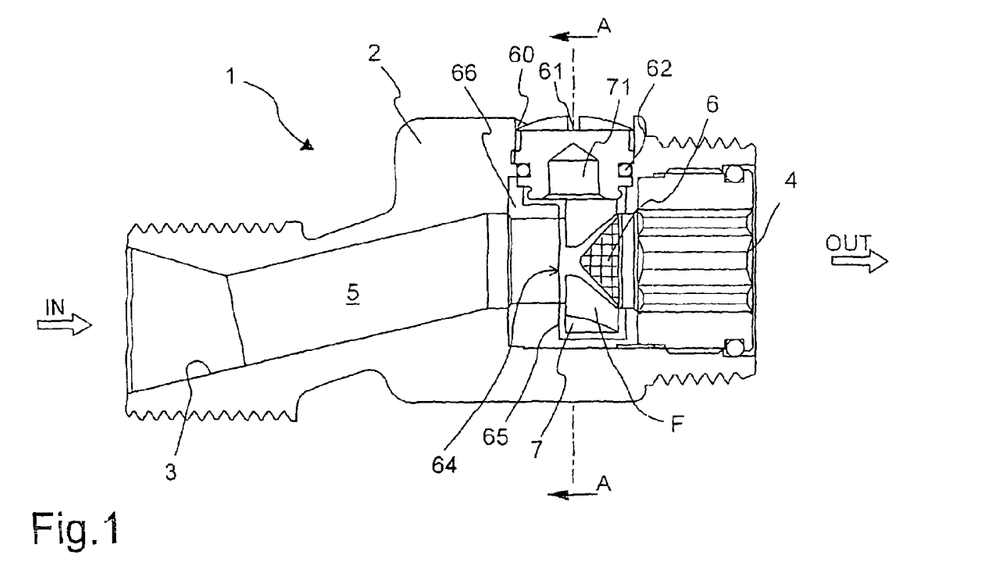
FIG. 1 is a sectional view of a connecting element according to the present invention.

FIG. 1 shows a connecting element 1 according to the present invention. Particularly, the element 1 is shown in a longitudinal section relative to IN-OUT axis. The connection 1 comprises a body 2 in which a channel 5 allowing a fluid to flow from the inlet section 3 to the outlet section 4 is obtained.

As it can be seen, the connecting element 1 has an eccentric shape. Generally, the connection 1 can have different shapes, i.e. the channel 5 can be either straight or curved. The channel 5 may also have a U-course, an S-course, it may form a double curve, etc.

The inlet 3 and outlet 4 sections can be coupled with different portions of a water supply line, for example through a traditional screw coupling.

The fluid supplied to the connection 1 from FIG. 1 is water. Particularly, the water is supplied by a line (not shown) to the inlet section 3 according to a direction being substantially parallel to the direction of arrow IN. The water flows through the channel 5 in the same direction and reaches the outlet section 4, thus being delivered to the direction of arrow OUT. Downstream of the section 4 there may be provided a pipeline, a flexible duct, a faucet, a water supply line for showers, a boiler, a water-heater, etc.

If the connection 1 is employed in the industrial field, for example in a supply circuit of a lubricate coolant supplied to a lathe or a milling machine, downstream of the section 4 there may exist a collecting tank, a nozzle, a mixer, etc.

The connecting element 1 is provided with a filter element F being coupled with the body 2 in a removable manner. Particularly, the filter element F is inserted into an aperture 60 which communicates the channel 5 with the outside. The coupling between the aperture 60 and the element F is preferably tight. When the filter F is coupled with the body 2, it intercepts the fluid flowing into the channel 5, thus stopping the possible suspended impurities. The filter F can be removed from the aperture 60 and, hence, from the connecting element 1.

In the embodiment shown in FIG. 1, the filter element F comprises a baffle 6', associated to the surface 6, linked to a pin 61 which can be screwed into the body 2, i.e. the pin 61 may be screwed in the aperture 60 which is transversal to the channel 5.

Always according to the present invention, the pin 61 may be replaced by an handle, a lever or any other equivalent device/component/element.

Advantageously, the filter element F has a shape different from a pure cylindrical one. As a rule, the filter element F is defined by at least two surfaces which encompass an internal area. The two surfaces may be coupled at their vertical edges to form angles or may flow one into the other with radiused joints. This permits the connecting element 1 to be unprovided with positioning means to avoid rotation of the filter element F around an axis transversal to channel 5. While the filter element of the connecting device disclosed in EP 0341345 must have wing-like projections in order to be locked in the channel in the proper position with respect to the flow direction, the filter element F of the device according to the present invention is self-orientating with no need for such positioning means. In fact the filter element F has a shape that match a corresponding seat provided in the body 2, i.e. a shape which is complementary with respect to the filter element seat.

This solution is particularly advantageous because the access to the filter element F, for example in order to clean or replace the latter, is simple and can be obtained in short times also from those unskilled in the art, with an obvious saving in the maintenance costs of the circuit provided with the connection 1.

The surface 6 may be a baffle itself or may be a surface supporting a baffle 6' having the function of filtering the water or the fluid flowing through the channel 5. The surface 6 supports the baffle 6' which may extend only for intercepting the effective fluid flow rate, thus avoiding oversizing of the same baffle 6'. According to the use which the connection 1 is addressed to, the baffle 6' may comprise some wire or plastic netting, spongy elements, drilled bulkheads, etc. In the specific case shown in FIG. 1, the baffle 6' has the function of stopping possible sand or limestone particles being in the water, and for this reason it consists of a gauze 6', made of wire or plastic, having a mesh of suitable sizes.

Alternatively, in the case where the baffle 6' is employed for filtering fluids different from water, it may comprise spongy elements, some gauze with meshes having different widths, etc. Furthermore, the filter element F could be destined to filter an alimentary fluid and for this reason it may comprise a cartridge containing a suitable and compatible material.

Figure 1A:
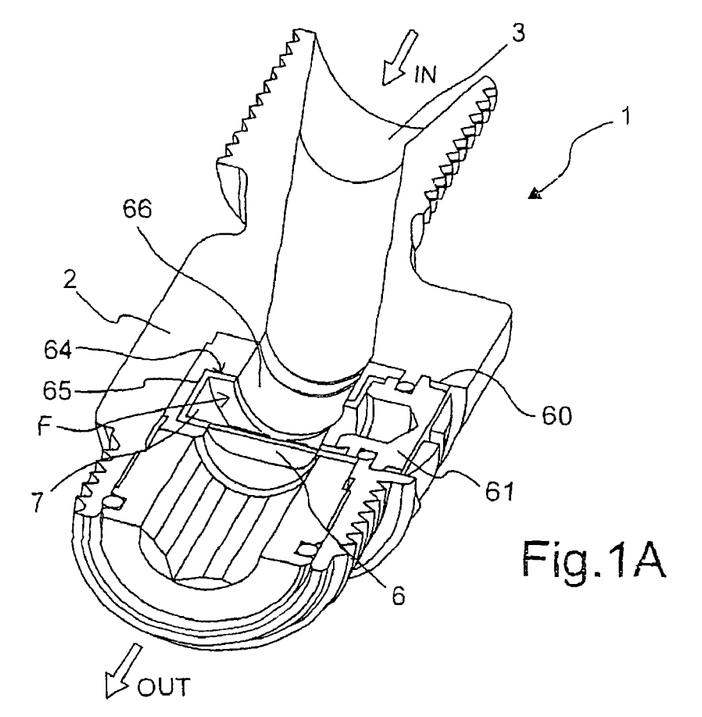
FIG. 1A is a perspective view of a longitudinal section of the connecting element shown in FIG. 1.
Figure 1B:
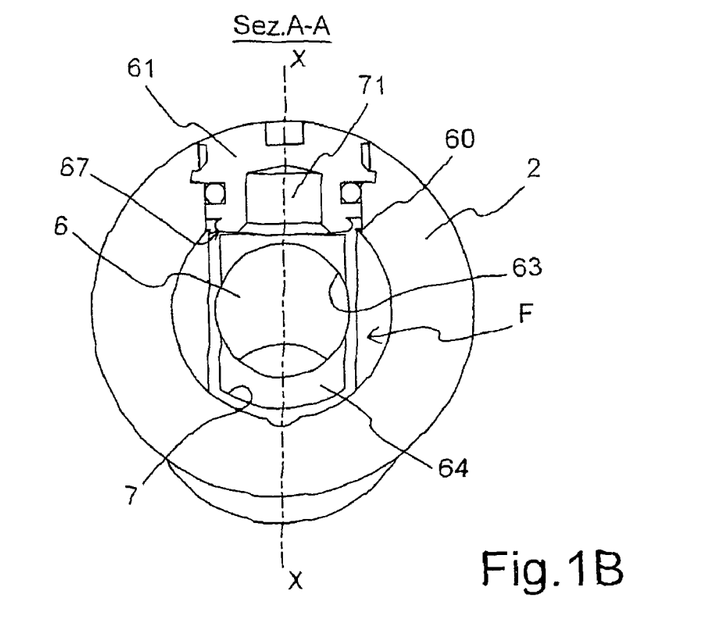
FIG. 1B is a section view along line A-A shown in FIG. 1.

With reference to the embodiment shown in the FIGS. 1, 1A and 1B, the filter element F has a semi-cylindrical shape. In particular, the filter element F has a planar face 64 which is jointed to the concave surface 6 provided with a baffle 6'. On the planar surface 64 is provided a window 63, preferably a circular window, for the flow to enter the filter element F. The flow exits the filter element F through the baffle 6' flowing toward the outlet section 4 after impurities have been blocked. The filter element F is lodged in a seat 65 provided within the body 2, proximately at the channel 5. The seat 65 has a shape suitable to lodge the filter element F without possibility for the same to rotate. The filter element F may be only inserted in the corresponding seat 65 by sliding through the aperture 60. Preferably the seat 65 has a semi-cylindrical shape. Thus the filter element F fits the complementary seat 65. In this way there is no need for projections equivalent to those disclosed in EP 0341345 to be provided on the filter element F in order to overcome misalignment of the window 63 with respect to the flow direction IN-OUT. The seat 65 may be provided in the body 2 for instance by machining or during melting of the body 2. Alternatively, the seat 65 may be provided by a suitable insert secured in the body 2 during assembling of the connection device 1. In the embodiment shown in the FIGS. 1-1B, the seat 65 is defined by an insert element 66.

As a rule, the filter element F may have any shape suitable to avoid its rotation within the body 2 of the connection device. For example, the filter element F and the seat 65 may have a square section (cross section with respect to the axis X-X), a triangular section, etc.

Figure 1C:
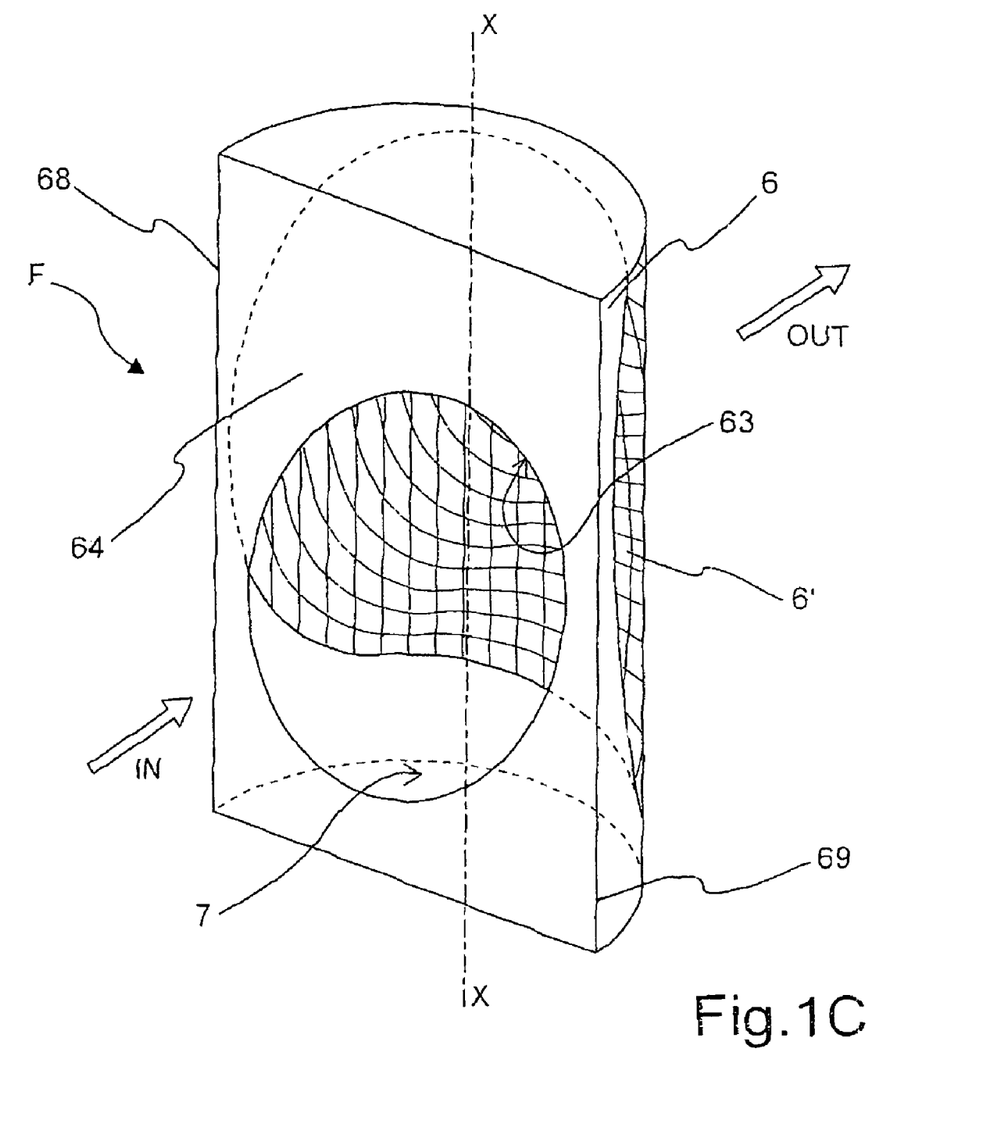
FIG. 1C is a schematic perspective view of a portion of a connecting element according to the present invention.

FIG. 1C shows, in a schematic view, a possible embodiment of the filter element F. It is formed by the planar face 64 and by the curved surface 6 jointed at the vertical edges 68 and 69 which are substantially parallel to the axis X-X, i.e. the filter element F has a general semi-cylindrical shape. The planar face 64 is intended to face the flow which enters the channel 5 and is provided with an opening or window 63 to permit the flow to enter the internal volume defined by the surfaces 64 and 6. This shape prevents the filter element to be positioned in a wrong way in the channel 5 of the connection device, i.e. the filter element F is self-orientating, self-centering and self-positioning with respect to its seat 65 within the body 2.

Generally, the surface 64 may be also a curved surface coupled to the surface 6 and joints 68 and 69 may be radiused joints, in such a way that the cross section of the filter element F has a cam shape. The filter element F may be also defined by more than two surfaces. For instance, it may be formed by four planar faces arranged as a parallelepiped having one face arranged crosswise the main direction IN-OUT of the fluid flow.

The surfaces 64 and 6 may be made of plastic, rubber, metal or any other suitable material. The baffle 6', provided on the surface 6, may be a metallic net coupled to the surface 64 by way, for example, of moulding.

In order for the filter element F to be locked in the body 2, the pin 61 is rotatable with respect to the same filter element F. In this way once the filter element is inserted in the seat 65 the pin 61 may be screwed to the body 2, thus biasing the filter F in the proper position. For example this may be achieved by providing a slidable ring-coupling 67 between the pin 61 and the filter element F, i.e. a coupling which allows the pin to rotate around the axis X-X of FIG. 1B while the filter element F is still inside the body 2.

The pin 61 may be screwed to the body 2, at the aperture 60, so not to project from the external surface of the connection device 1.

It is known to provide the filter element with one tank for collecting the filtered impurities. In the present invention, the filter element F is provided with two tanks, a bottom tank 7 arranged under the baffle or gauze 6' along axis X-X (FIG. 1B) and a top tank 71 arranged above the baffle or gauze 6'. Tanks 7 and 71 are arranged on opposite parts with respect to the baffle or gauze 6, thus permitting the device 1 to be connected to a flow supply line as shown in FIG. 1 or upside down. Solid particles are stopped by the element 6 and collected either in the bottom tank 7 or in the top tank 71 depending on the orientation of the connection device 1 in the space. This feature, i.e. providing a bottom tank and a top tank, permits to couple the connection device to external lines mostly regardless of the angle defined between the axis X-X and a vertical line. Advantageously, when the filter element F is unscrewed from the body 2, the bottom tank 7, being integral to the same filter element F, is extracted from the channel 5. In this manner, the tank 7 can be emptied out from the impurities which are, in case, contained therein. Therefore, the tank 7 allows the channel 5 to be cleaned from the impurities which could accumulate near the same gauze 6 even when the gauze 6 is extracted from the connection 1. In the embodiment shown in the FIGS. 1-1B, the top tank 71 is a hollow provided within the pin 61. The hollow 71 is provided on the bottom of the pin 61, facing the filter element F and communicating with its internal volume. When the connection device is arranged upside down, the top tank 71 is below the baffle or gauze 6 with respect to the axis X-X, i.e. is at the bottom of the device 1. Once the pin 61 is unscrewed from the body 2 also the tank 71 may be cleaned.

The tight coupling of the pin 61 with the body 2 is ensured, in the embodiment illustrated, by a suitable O-ring 62. Preferably, the pin 61 is provided with a notch suitable to allow the coupling with a tool suitable to unscrew the filter element F, such as a screwdriver. Alternatively, the pin 61 can be equivalently provided with a hand-wheel, an handle (lever) or a knob for the manual operating by the user.

According to a further embodiment, the pin 61 can be coupled to the outside with a spindle (pivot) (not shown) allowing the remote operation of the pin 61. For example, the connection 1 can be built in a niche obtained inside a wall and the spindle can be set so as to cross the same niche, thus protruding outside. This spindle can be, in turn, provided either with a notch for coupling with a screwdriver, or can be provided with a hand-wheel, a knob or elements equivalent thereto.

The maintenance of the filter element F is particularly simple. For example, if the connection 1 is provided upstream of a thermostatic faucet in a private dwelling, the same user can clean the gauze 6, simply by unscrewing the pin 61 from the connection 1 with a screwdriver and rinsing the gauze 6. Once the gauze 6 has been cleaned (or replaced if necessary), the pin 61 can be screwed again into the body 2 of the connection 1. It will be appreciated that the maintenance costs of the hydraulic circuit are reduced thanks to the easy cleaning actions of the filter F, and these operations neither require specialized operators, nor the disassembling of the supply line.

In order to uncouple the filter element F from the body 2 the water supply needs to be interrupted upstream of the filter element F. This can be carried out by closing a faucet, such as the main faucet of the private dwelling, and by interrupting the water flow in the supply line to the connection 1. In this case, disadvantageously also other supply lines connected to the same main faucet can be left isolated. FIGS. 2 and 4-7 show different embodiments of the connection 1 according to the invention which solve this drawback, thus allowing to isolate only the connection 1 rather than other lines of the same circuit upstream of the same connection.

As it can be seen in FIGS. 2-2B and 4-7, the connection 1 may comprise a valve 8 for stopping the fluid, preferably arranged upstream of the filter element F. The stop valve 8 can be of the conventional type; in the annexed figures the valve 8 is of a ball-shaped type, being controlled by a spindle 81.

Figure 2:
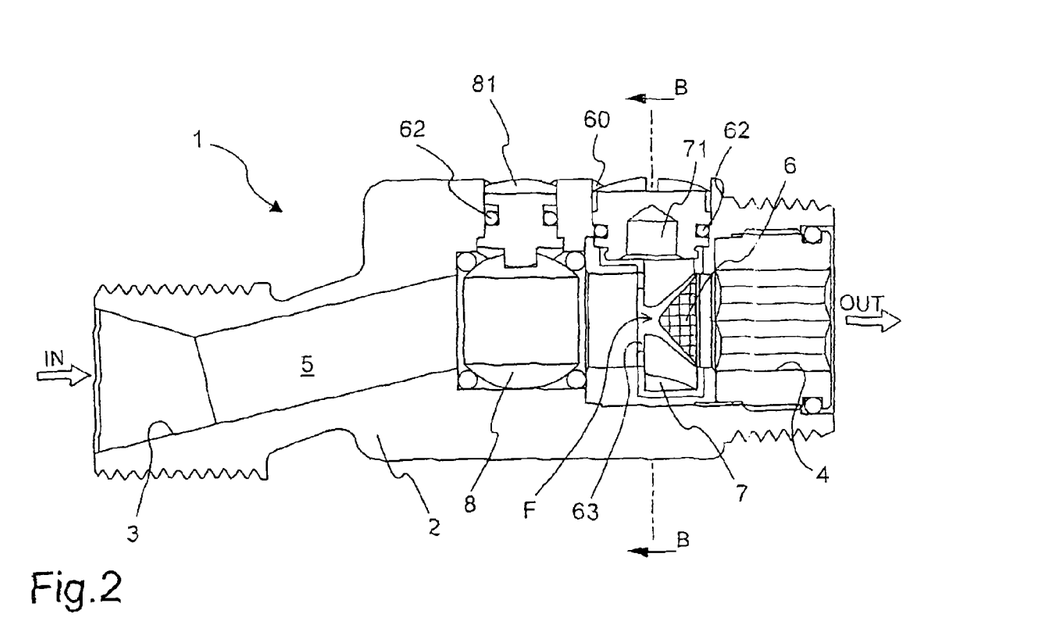
FIG. 2 is a sectional view of a second embodiment of the connecting element according to the present invention.
Figure 2A:
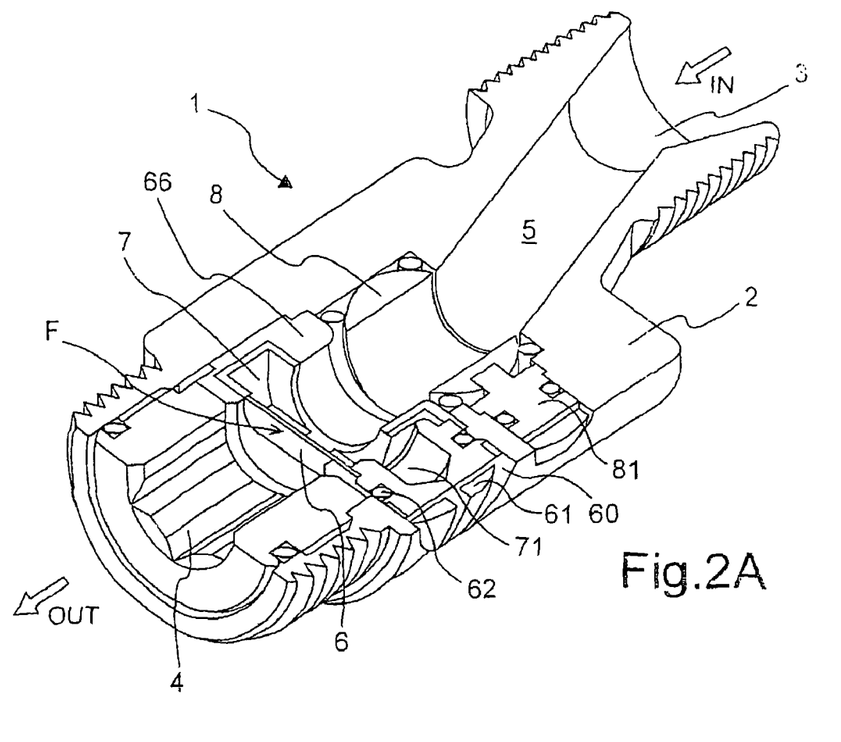
FIG. 2A is a perspective view of a longitudinal section of the embodiment shown in FIG. 2.
Figure 2B:
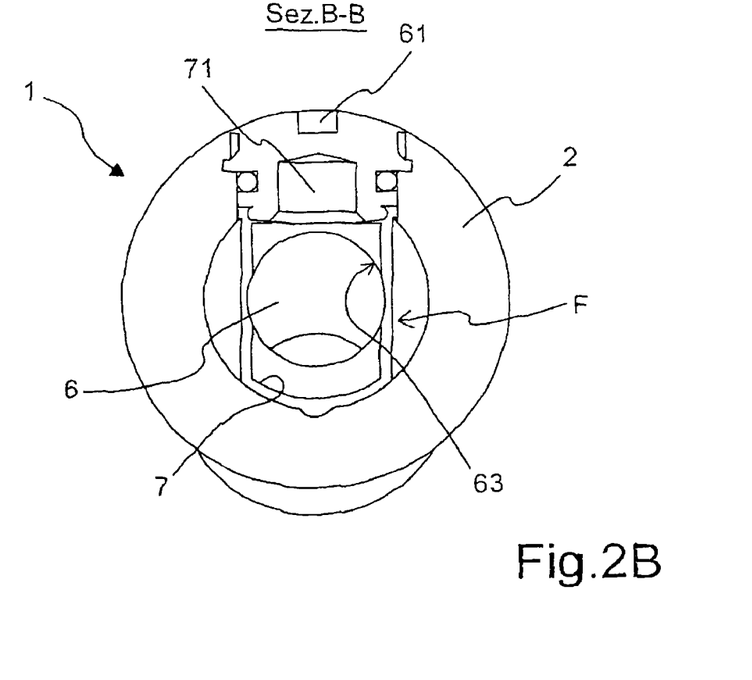
FIG. 2B is a section view along line B-B shown in FIG. 2.
Figure 3:
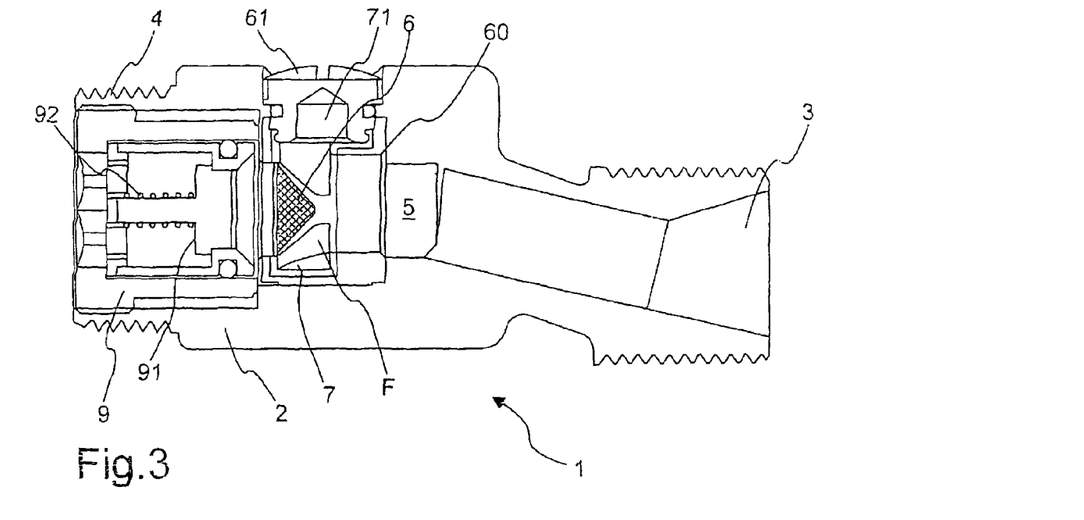
FIG. 3 is a sectional view of a third embodiment of the connecting element according to the present invention.

FIG. 2A shows a perspective view of a longitudinal section of the connection device of FIG. 2. As it can be appreciated, the filter element F is oriented with the window 63 facing the valve 8. Tanks 7 and 71 are provided for allowing arrangement of the device 1 as shown in FIG. 2 or upside down. FIG. 2B shows a cross section of the device 1 of FIG. 2 along the line B-B.

Figure 6:
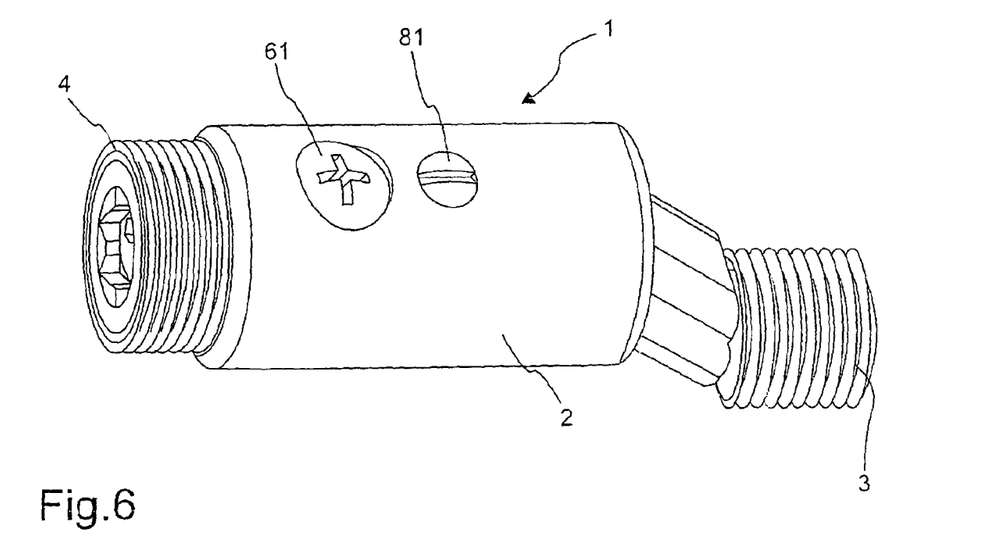
FIG. 6 is a perspective view of the connecting element from FIG. 5.

Due to the valve 8, the maintenance of the connection 1 and the line downstream are simplified. The water can be blocked by the valve 8 in the channel 5, with no need to insolate the line upstream of the connection. Therefore, the filter F can be extracted for maintenance. FIG. 6 shows the spindle 81 of the stop valve 8 as well as the screw 61 of the filter element F. It will be understood by those skilled in the art that the spindle 81 and the screw 61 may be externally equipped with handwheels, handles, knobs or similar devices in order to facilitate the manual operating by the user. Moreover, in order to allow the remote operating of the stop valve 8 and the filter element F, these elements may be each provided with a remote control device, such as an extension being coupled with the spindle 81 and the screw 61. The possible extension may comprise for example a little shaft or a flexible tool allowing a user to carry out a remote rotation of the spindle 81 and/or the screw 61. The extension may be in turn provided with a hand-wheel, a knob, etc.

Moreover, the connection 1 may be equipped with a check valve having the function of preventing the fluid from flowing back into its respective supply line. FIGS. 3-7 show a connection 1 according to the present invention being provided with a check valve 9. Preferably, the valve 9 is provided in the channel 5 downstream of the filter element F. The valve 9 shown is of a conventional type and it is provided with a shutter 91 suitable to selectively open and close the channel 5 according to the compression or extension movement of the stop spring 92. Due to the check valve 9, fluid is prevented from flowing through the channel 5 in the opposite direction to the supplying direction, i.e. in the opposite direction to the IN direction from FIG. 1. For example, in this manner the risk that the water treated, or employed in a machinery, may flow back into the supply line thus contaminating the water upstream of the connection 1 is reduced.

Figure 4:
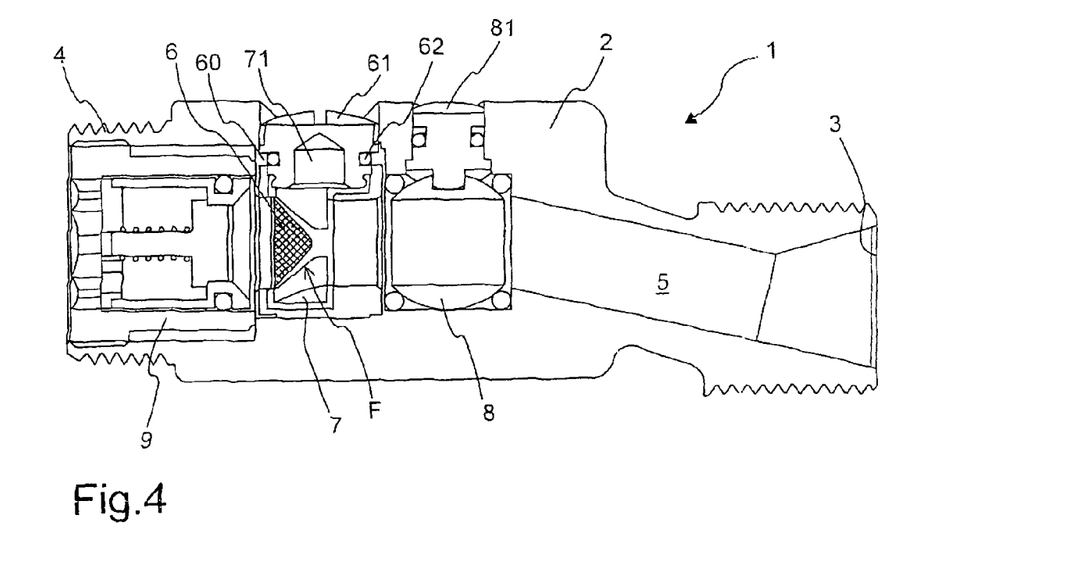
FIG. 4 is a sectional view of a fourth embodiment of the connecting element according to the present invention.

The embodiment shown in FIG. 4 provides both the stop valve 8, and the check valve 9. The valves 8 and 9 are preferably arranged behind the filter element F, so as to reduce the pressure losses in the line.

Figure 5:
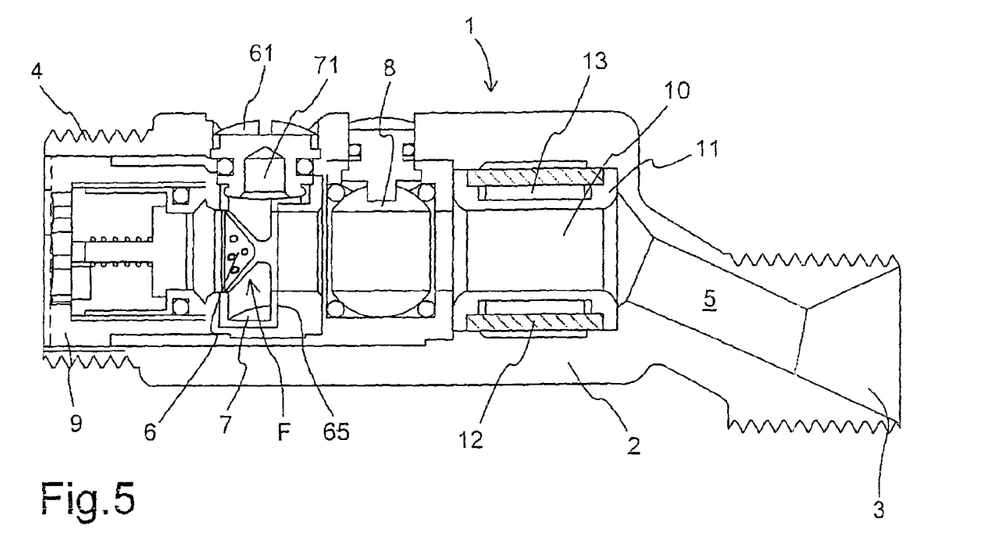
FIG. 5 is a sectional view of a fifth embodiment of the connecting element according to the present invention.
Figure 7:
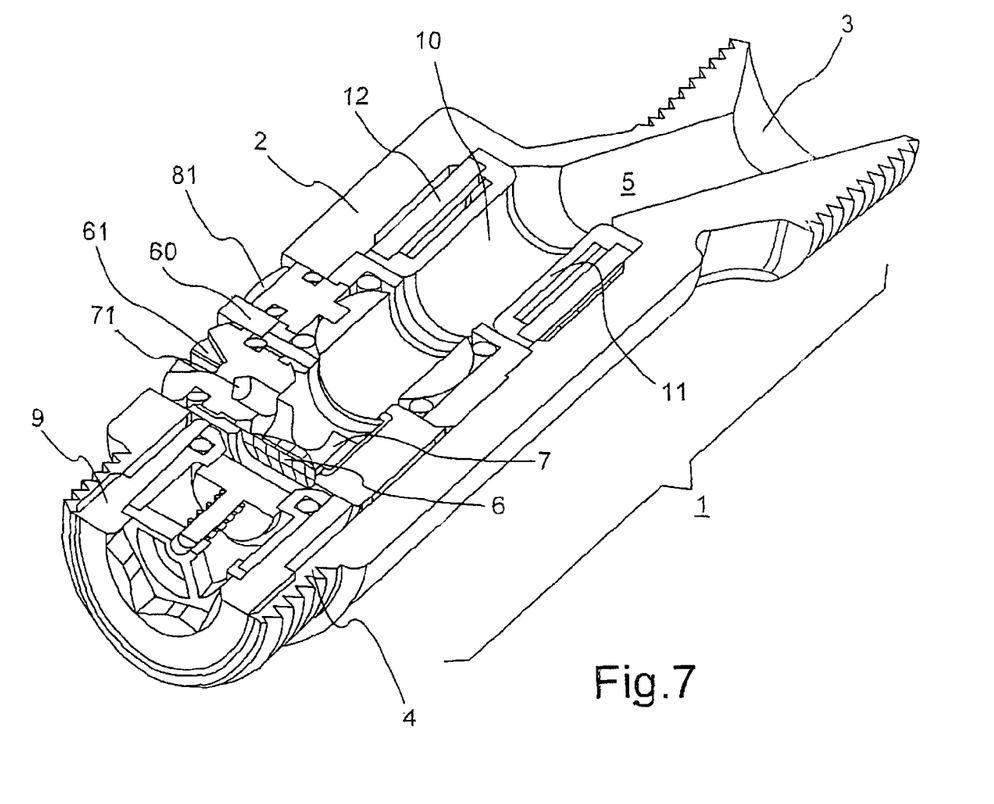
FIG. 7 is a sectional perspective view of the connecting element from FIG. 5.

FIGS. 5-7 show a further embodiment of the connection 1 according to the present invention, in this case being provided with a device 10 for absorbing the vibrations transmitted by the fluid to the body 2. The device 10 comprises a portion 11 which can be elastically deformed either to at least partially absorb the changes in the flow rate of the fluid entering the channel 5, or to at least partially absorb the turbulence thereof. The portion 11 is preferably a sheathing which is fastened to a bush 12 being inserted into the duct 5. A gap 13 allowing the sheathing to expand can be found between the sheathing 11 and the bush 12. By deforming, the sheathing 11 is able to absorb either the "water hammers" transmitted by the fluid to the connection 1, or the impact of the fluid entering a curved length of the channel 5 at high speed, etc. Therefore, the vibration absorbing element 10 absorb allows to reduce the noise caused by the pipelines because of the vibrations transmitted thereto by the fluid supplied.

Preferably, the sheathing 11 is implemented in silicone. Alternatively, the sheathing 11 may be implemented in a material having mechanical characteristics similar to the characteristics of the silicone, such as rubber or a similar material.

In the embodiment shown, the device 10 is set upstream of the stop valve. Generally, the device 10 may be indifferently set along the channel 5, but preferably it is provided either at the inlet section 3 or at a curve or a section change of the channel 5, as shown in details in FIG. 7.

Figure 8:
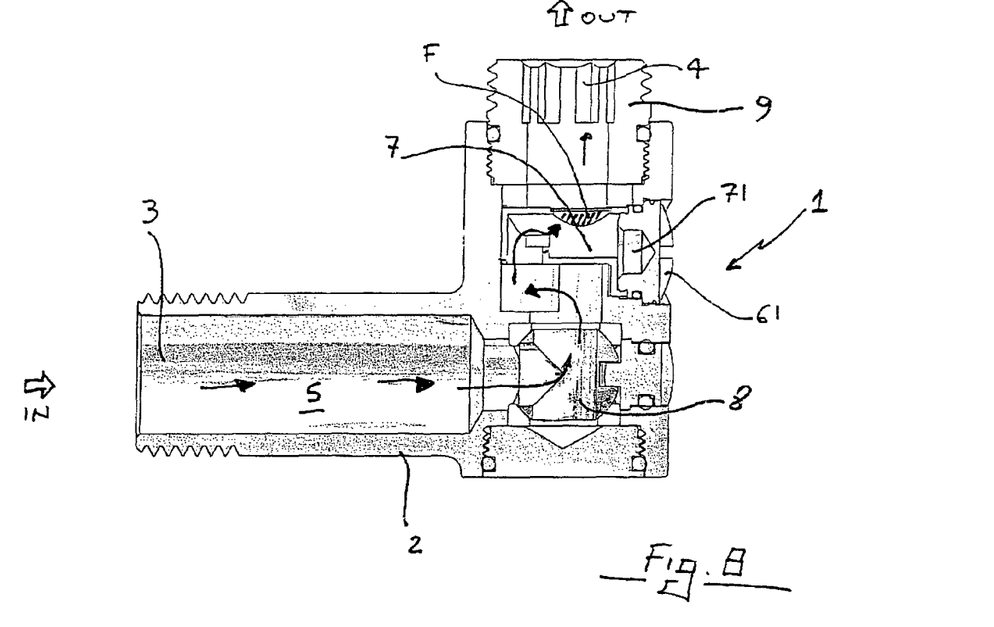
FIG. 8 is a longitudinal sectional view of another embodiment of the connecting element of the present invention.
Figure 9:
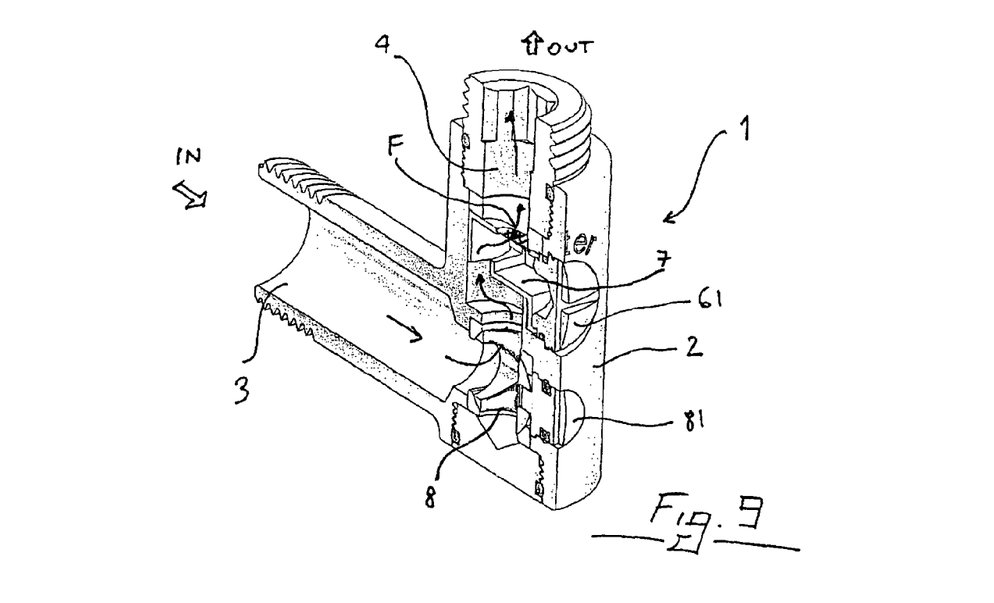
FIG. 9 is a perspective sectional view of the connecting element shown in FIG. 8.

FIGS. 8 and 9 refer to an embodiment of the connection element 1 according to the present invention wherein the inlet section 3 and the outlet section 4 are at an angle of 90°. The channel 5, internal to the body 2, provides a 90° corner which allows for installation of the element 1 where the water supplying line is perpendicular to the supplied line, as it happens for instance for sinks or the like. The skilled person will understand that the angle between the inlet portion and the outlet portion may also be different, for instance 60°, 120°, 160°, etc. The valve 8 is located upstream of the filter element F to block or to partially intercept the liquid entering channel 5. The filter element F has a substantially semi-cylindrical shape, similar to the shape of the filter element shown in FIG. 1C. The filter element F can be inserted/removed from the body 2, for instance for cleaning or replacement, by acting on the pin 61, as previously described. The filter element F provides a tank portion 7 adapted to collect solid particles which are filtered from the liquid. The filter element F may abut a respective seat provided within the body 2 of the device 1, but preferably it is supported by a plastic member inserted in the body 2 during assembling of device 1 and acting as a seat.

The connection element shown in FIGS. 8 and 9 is preferably to be mounted so as that the flow at the inlet section moves horizontally and the flow at the outlet section moves substantially vertically.

As it can be appreciated, the connection device 1 according to the present invention allows for an extremely easy positioning of the filter element F inside the body 2, in its seat 65, with no need for unhandy positioning means as those disclosed in EP 0341345. The filter element F may be simply handled by an unskilled user with no need for him to pay attention to the positioning of the same filter element F in the channel 5 with respect to flow direction. In fact due to its shape, the filter element F is self-positioning within the seat 65 with evident advantages in cleaning operations.

Moreover, the connection device 1 of the present invention may be arranged also upside down, this leading to clear advantages in connecting the same to flow lines regardless of the vertical orientation of the filter element F. In particular, since the device 1 is provided with two tanks for collecting filtered impurities, it may be arranged with the pin 61 at the bottom, facing the ground, or at the top.

Another advantage of the device 1 over prior art connection devices is in that the pin 61 and the command spindle 81 of the valve 8 may be arranged on the same side with respect to the channel 5, i.e. they may open on the external surface of the body 2 positioned side by side.

The engagement of the filter element F with its seat 65 may be extremely precise. This leads to important improvements in the filtering action of the connection device 1 of the present invention. In fact the precise fit minimizes or prevents by-pass of the same filter element F from the fluid. Thus the baffle 6' may have an extremely small mesh, i.e. the side of a single element of the net may have a minimum length of 0.1 mm which is extremely low with respect to prior art filter. Thus the mesh of baffle 6' may be at least 50% finer than the mesh of prior art filters.

The invention claimed is:

1. A connecting element for hydraulic circuits, comprising:
    a body being provided with at least one channel having an inlet section and an outlet section, the at least one channel being connectable with a fluid supply line, said body being further provided with at least an aperture which opens, to the outside, into a seat located in the at least one channel between said inlet section and said outlet section;
    a filter element that is removably insertable into said seat, through said at least one aperture, in order to intercept said fluid in said channel; and
    a pin element that is rotatably coupled to the filter element and, in use, closes the opening,
    wherein said filter element is defined by at least two portions that are coupled with angled or radiused joints to define an internal volume, the at least two portions having different geometries from one another,
    wherein the seat and the filter element have complementary asymmetrical profiles,
    wherein said pin element includes a hollow tank facing the filter element, the hollow tank configured to collect solid impurities carried by said fluid.

2. The connecting element according to claim 1, wherein one of said at least two portions is a planar face arranged crosswise a direction of the fluid flow in the channel and abutting a corresponding surface of said seat to avoid rotation of the filter element.

3. The connecting element according to claim 2, wherein a window is provided on said planar face for the fluid to enter the filter element.

4. The connecting element according to claim 1, wherein said filter element has a substantially semi-cylindrical shape.

5. The connecting element according to claim 1, wherein said seat has a counter-shape matching the shape of said filter element.

6. The connecting element according to claim 5, wherein said seat is defined by said body and by an insert element.

7. The connecting element according to claim 1, wherein said filter element comprises at least one baffle which is insertable into said channel, said baffle being equipped with a plurality of apertures for the flowing of said fluid.

8. The connecting element according to claim 1, wherein said baffle is associated to a bottom tank for collecting impurities carried by said fluid.

9. The connecting element according to claim 1, wherein said filter element is washable.

10. The connecting element according to claim 1, further comprising a stop valve for stopping said fluid.

11. The connecting element according to claim 10, wherein said valve is provided with a command spindle which opens on the same side of a pin element which closes the aperture for the filter element.

12. The connecting element according to claim 1, further comprising a check valve suitable to prevent said fluid from flowing through said inlet section.

13. The connecting element according to claim 12, wherein said check valve is interposed between said filter element and said outlet section.

14. The connecting element according to claim 1, further comprising an absorbing element to absorb the vibrations transmitted by said fluid to said body while flowing into said channel.

15. The connecting element according to claim 14, wherein said vibration absorbing element comprises a portion, elastically deformable, and which covers at least partially the internal surface of said channel.

16. The connecting element according to claim 15, wherein said portion is made of silicone and/or rubber.

17. A hydraulic circuit comprising at least one connecting element according to claim 1.

18. The connecting element according to claim 1, wherein said at least one channel provides an angle between 0° and 180°.

19. The connecting element of claim 1, wherein the asymmetrical profile of the filter element is asymmetrical with respect to a plane that is substantially perpendicular to a direction that fluid is to flow through the filter element.

20. The connecting element of claim 1, further comprising at least two tanks that are configured to hold particulates that are to be intercepted by the filter element when fluid flows through the filter element.

21. The connecting element of claim 20, wherein the at least two tanks are located on opposing sides of where fluid is to flow through the filter element.

* * * * *